United States Patent
Pernu

(10) Patent No.: US 8,228,922 B2
(45) Date of Patent: Jul. 24, 2012

(54) MULTIRADIO SYNCHRONIZATION AND SCHEDULING CONTROL

(75) Inventor: Ville Pernu, Tampere (FI)

(73) Assignee: Nokia Corporation, Espoo (FI)

( * ) Notice: Subject to any disclaimer, the term of this patent is extended or adjusted under 35 U.S.C. 154(b) by 1366 days.

(21) Appl. No.: 11/647,620

(22) Filed: Dec. 29, 2006

(65) Prior Publication Data

US 2008/0161041 A1    Jul. 3, 2008

(51) Int. Cl.
*H04L 12/28*    (2006.01)
*H04J 3/06*    (2006.01)
*H04M 1/00*    (2006.01)

(52) U.S. Cl. .................. 370/395.4; 370/350; 455/553.1
(58) Field of Classification Search ................... 370/337
See application file for complete search history.

(56) References Cited

U.S. PATENT DOCUMENTS

| | | | |
|---|---|---|---|
| 6,687,260 B1* | 2/2004 | Peace ........................... | 370/450 |
| 7,065,367 B2 | 6/2006 | Michaelis et al. .......... | 455/452.2 |
| 7,187,923 B2 | 3/2007 | Mousseau et al. ............ | 455/416 |
| 7,190,679 B2 | 3/2007 | Khawand et al. ........... | 455/553.1 |
| 7,373,172 B2 | 5/2008 | Godfrey ....................... | 455/552.1 |
| 2003/0058830 A1* | 3/2003 | Schmidt ........................ | 370/347 |
| 2003/0083095 A1 | 5/2003 | Liang ........................... | 455/552 |
| 2004/0242159 A1* | 12/2004 | Calderon et al. ............ | 455/63.3 |
| 2005/0215284 A1 | 9/2005 | Su et al. ....................... | 455/556.2 |
| 2006/0068837 A1 | 3/2006 | Malone ........................ | 455/552.1 |
| 2006/0205401 A1 | 9/2006 | Palin et al. ................... | 455/425 |
| 2006/0292968 A1 | 12/2006 | Fujii ............................. | 451/54 |
| 2008/0101446 A1 | 5/2008 | Gautier et al. ............... | 375/222 |
| 2010/0054215 A1* | 3/2010 | Stahl et al. ................... | 370/337 |

FOREIGN PATENT DOCUMENTS

| | | |
|---|---|---|
| EP | 1119137 A1 | 7/2001 |
| EP | 1708420 A1 | 10/2006 |
| WO | WO 2004/045092 A1 | 5/2004 |

OTHER PUBLICATIONS

Marina, Mahesh K., et al., "A Topology Control Approach for Utilizing Multiple Channels in Multi-Radio Wireless Mesh Networks", Proc. Broadnets 2005 Symposium, Boston, MA, Oct. 2005, 10 pgs.

* cited by examiner

*Primary Examiner* — Patrick Edouard
*Assistant Examiner* — Huy C Ho
(74) *Attorney, Agent, or Firm* — Harrington & Smith

(57) ABSTRACT

A method, device, component and computer program product are described for controlling radios/modems in a multiradio device so as not to interfere with one another. A first set of timeslots for a first modem of the device is mapped to a master clock. A second set of timeslots for a second modem of the device is mapped to the master clock. Specific transmit and receive schedules for the modems are assembled into scheduling tables and potential instances of interference are found. Transmission, reception, or both for one of the modems (the first modem) is inhibited during an authorized timeslot of the first set that overlaps with an authorized timeslot of the second set. The authorized timeslots are determined from the transmit and receive schedules.

31 Claims, 7 Drawing Sheets

| | |
|---|---|
| INITIAL TICK _34_ | 32 BITS |
| TABLE SIZE _36_ | 32 BITS |
| IS CYCLING _38_ | 1 BIT |
| SLOT/TRAFFIC ELEMENT BORDER _40a_ | 1 BIT |

⋯

| | |
|---|---|
| SLOT/TRAFFIC ELEMENT BORDER _40x_ | 1 BIT |

| | |
|---|---|
| INITIAL TICK _44_ | 32 BITS |
| TABLE SIZE _46_ | 32 BITS |
| IS CYCLING _48_ | 1 BIT |
| Tx ALLOWED/BLOCKED _50a_ | 2 BITS |
| Rx ALLOWED/BLOCKED _52a_ | 2 BITS |

⋯

| | |
|---|---|
| Tx ALLOWED/BLOCKED _50y_ | 2 BITS |
| Rx ALLOWED/BLOCKED _52y_ | 2 BITS |

MULTIRADIO SYNCHRONIZATION AND SCHEDULING CONTROL

CROSS-REFERENCE TO RELATED APPLICATIONS

This application is related to two U.S. patent applications filed this same day: U.S. patent application Ser. No. 11/648,100 entitled "Apparatus, Methods and Computer Program Products Providing Temporary Link Quality Modification for Multiradio Control"; and U.S. patent application Ser. No. 11/647,615 entitled "Apparatus, Methods and Computer Program Products Providing Pattern Masking Scheduling for Multiradio Control"; both of which are incorporated by reference.

TECHNICAL FIELD

The exemplary and non-limiting embodiments of this invention relate generally to wireless devices having more than one modem/transceiver that may operate simultaneously and potentially interfere with one another. More particularly, embodiments of this invention relate to a method and apparatus and program within a multiradio device for controlling the modems/transceivers so as not to interfere in transmission and/or reception with one another.

BACKGROUND

Various distinct networks exist over which a wireless device can communicate, such as a mobile telephony network (e.g., CDMA, GSM, etc.), a wireless local area network WLAN or WiFi network, a piconet (e.g., Bluetooth). Wireless devices that communicate over multiple such networks are termed herein as multiradio devices, indicative of the multiple radios that such a device incorporates so as to enable communication over multiple networks. For example, a WLAN access point may have a radio for communication with WLAN terminals; a Bluetooth radio to couple with a printer; and a wired or wireless (e.g., Bluetooth, infrared, another WLAN) connection to the Internet. Similarly, a mobile terminal/mobile station may have one GSM modem, a CDMA modem, a Bluetooth modem (e.g., with a headset), and a DVB-H modem. Any individual multiradio device may also have more than one radio for communicating over a single network, such as a mobile station having two GSM radios so as to avoid switching between an active Node B and another Node B in preparation for a handover. Each of these radios has a modem, and "modem" and "radio" will be used interchangeably hereinafter.

More particularly for the modems operating under control of different networks, there is a potential for modems to interfere with one another when transmitting or receiving simultaneously with other modems where the disparate networks use frequency ranges that overlap and each network schedules/authorizes the multiradio device to transmit/receive at an overlapping frequency at the same time. The result is wasted bandwidth due to data collisions from different modems of the same wireless device.

One fundamental difficulty in designing a multiradio device to avoid self-collision among its modems is the ability to interpret any modem's behavior regardless of the clock-domain it uses. Not only do the modems typically have their own hardware clocks with different frequencies as compared to other modems of the same device, but they are also synchronized with their corresponding peer devices (e.g., WLAN with access point, GSM with base station, Bluetooth with an ad hoc peer). As the mobile device is moved around, its modems' synchronization with the respective peer shifts and changes, thus offsetting their transmission instances. The result is that any difference between transmission grant start times on different networks is not constant. The term slot is used herein generically to represent an authorized transmission or reception window. While the term slot is specific to some radio protocols, its use herein does not imply limitation to only those radio protocols that use the term explicitly.

Another difficulty is the nondeterministic nature of delays caused by bus arbitration within the multiradio device. If all the timing-critical functions designed for multiradio control were to be placed in a central processor, the signaling between modems and that central processor becomes the volatile factor that may handicap the entire design concept. At best it makes a software design difficult and reduces its portability among different types of multiradio devices that operate on the same sets of networks, since the different types of multiradios would exhibit different bus arbitration. At worst it generates a substantial load on that central processor due to timer checks and resynchronization calculations caused by inaccurate time information.

Other issues are raised by operation of such multiradio devices. Since it is often impossible to allow more than one radio or modem of the multiradio device to access a common communications resource (such as, for example, a common communications channel) at the same time, access to the common communications resource has to be allocated in some manner. In one conceivable allocation scheme, access to the common communications resource may be allocated in a pre-determined manner, with one modem being allocated a certain percentage of non-concurrent access; another modem being allocated a different percentage of non-concurrent access, etc.

Such an approach, though, may not accommodate transient needs of one of the modems for a higher percentage of access due to, for example, criticality of information being communicated. Although allocation by percentage may be desirable for most situations, it would also be desirable to deviate from this allocation scheme for a temporary period of time. Accordingly, those skilled in the art seek methods and apparatus that are capable of providing such modes of operation.

SUMMARY

In accordance with an exemplary embodiment is a method that includes mapping a first set of timeslots for a first modem of a device to a master clock, mapping a second set of timeslots for a second modem of the device to the master clock, and inhibiting at least one of transmission or reception of the first modem during an authorized timeslot of the first set that overlaps with an authorized timeslot of the second set.

In accordance with yet another exemplary embodiment is a device that includes a memory, a first modem and a second modem, and at least one processor coupled to the memory, and to each of the first and second modems. The at least one processor is configured to map a first set of timeslots received for the first modem to a master clock, and to map a second set of timeslots for the second modem to the master clock. Using that mapping, the at least one processor is configured to inhibit at least one of transmission or reception of the first modem during an authorized timeslot of the first set that overlaps with an authorized timeslot of the second set.

In accordance with another exemplary embodiment is a computer program product, embodied on a computer readable storage medium, which includes instructions to cause a digital processor to perform actions directed toward scheduling modems within a device. In this embodiment, the instructions include mapping a first set of timeslots for a first modem of a device to a master clock, mapping a second set of timeslots for a second modem of the device to the master clock, and thereafter inhibiting at least one of transmission or reception of the first modem during an authorized timeslot of the first set that overlaps with an authorized timeslot of the second set.

In accordance with yet another exemplary embodiment is a component, such as for example an ASIC, that includes at least one first input configured to couple to a first modem and at least one second input configured to couple to a second modem. Further, there is a first data pathway configured to couple with a processor and adapted to receive a master clock signal therefrom. A first output of the component is configured to couple to the first modem and adapted to output a first set of allow/inhibit signals, and a second output of the component is configured to couple to the second modem and adapted to output a second set of allow/inhibit signals. The component is configured, such as for example via hardware, software or a combination of them, a) to map a set of first slot boundaries of a first transceiving schedule for the first modem to the master clock, b) to map a set of second slot boundaries of a second transceiving schedule for the second modem to the master clock, and c) to generate the allow/inhibit signals so as to inhibit at least one activity of the first transceiving schedule in an authorized slot defined by the set of first slot boundaries that overlaps with an authorized slot defined by the set of second slot boundaries.

In accordance with yet another exemplary embodiment is a device that includes first modem means and second modem means, means for mapping a first set of timeslots for the first modem means to a master clock, means for mapping a second set of timeslots for the second modem means to the master clock, and inhibiting means for inhibiting at least one of transmission or reception of the first modem means during an authorized timeslot of the first set that overlaps with an authorized timeslot of the second set. In an embodiment, the first modem means includes a first transceiver configured to communicate over a first network and the second modem means includes a second transceiver configured to communicate over a second network that is different from the first network. In an embodiment, the means for mapping the first and second sets of timeslots includes an application specific integrated circuit or an application specific integrated instruction processor. In an embodiment, the means for inhibiting includes a control signal pathway from the means for mapping to the first modem, where the pathway is adapted, corresponding to at least each authorized timeslot of the first set, to carry two bits: a transmission allow/inhibit bit and a reception allow/inhibit bit.

Further details as to various embodiments and implementations are detailed below.

BRIEF DESCRIPTION OF THE DRAWINGS

The foregoing and other aspects of these teachings are made more evident in the following Detailed Description, when read in conjunction with the attached Drawing Figures.

FIG. 2 illustrates an exemplary format for a synchronization table that may be generated for one of the modems in FIG. 1, according to an exemplary embodiment of the invention.

FIG. 3b is similar to FIG. 3a, but showing another exemplary embodiment of the invention for a different type of network architecture as compared to FIG. 3a.

FIG. 4 illustrates an exemplary format for a scheduling table that may be generated for one of the modems in FIG. 1, according to an exemplary embodiment of the invention.

DETAILED DESCRIPTION

In view of the bus arbitration and network timing variability discussed above, the inventors have determined that it is advantageous to map the different modems to a common reference time. Without this mapping any cross-modem comparison is meaningless, since a time value for one modem can mean something totally different to any other modem. Two terms are introduced: a Multiradio Controller MRC, and a Synchronization and Scheduling Controller SSC. The MRC may be a processor, such as a central processing unit, that controls the radios/modems in the device. Functionally, the MRC manages the interoperability issues between modems on a radio front-end level. The SSC may be an application specific integrated circuit ASIC, an application specific instruction set processor ASIP, or specific functionality built into the MRC, or even software only executable by the MRC. For ready implementation without having to re-design existing MRCs, advantageous embodiments include an ASIC/ASIP though the invention is not limited only to that embodiment. The MRC and SSC are described separately herein for clarity of description, though it should be recognized that the differing functionality may be embodied within a single processor.

Functionally, the SSC provides the MRC with the capacity to communicate with any radio on a timing-accurate level. According to specific embodiments detailed below, the SSC: 1) synchronizes the MRC with all modems and places their behavior into a common reference time domain; and 2) sets traffic schedules to modems according the instructions given by the MRC. As will be seen, certain advantages of embodiments of the invention include:

Reduced terminal power consumption. Because the SSC is in some embodiments a separate calculation element from the master control unit MCU (which processes the MRC core functions), it allows the MCU to be put to a power-save mode more often, since all frequent time-critical functions are executed in the SSC.

Removes the need for tight time-critical control in the MCU, drastically simplifying the design of software for the MRC.

Removes the need for time-aware bus arbitration between modems and the MRC.

Allows the efficient control of all modem traffic with minimum changes to the modems themselves (e.g., the modems need not store long vectors of scheduling information, since the control signals detailed below from the SSC have deterministic and minimal delay times.

Stability over time. Because of the deterministic nature of the control signal delays between modems and SSC, the synchronization table detailed below is very reliable and is expected to last a fairly long time without the need for resynchronization.

Figure 1:
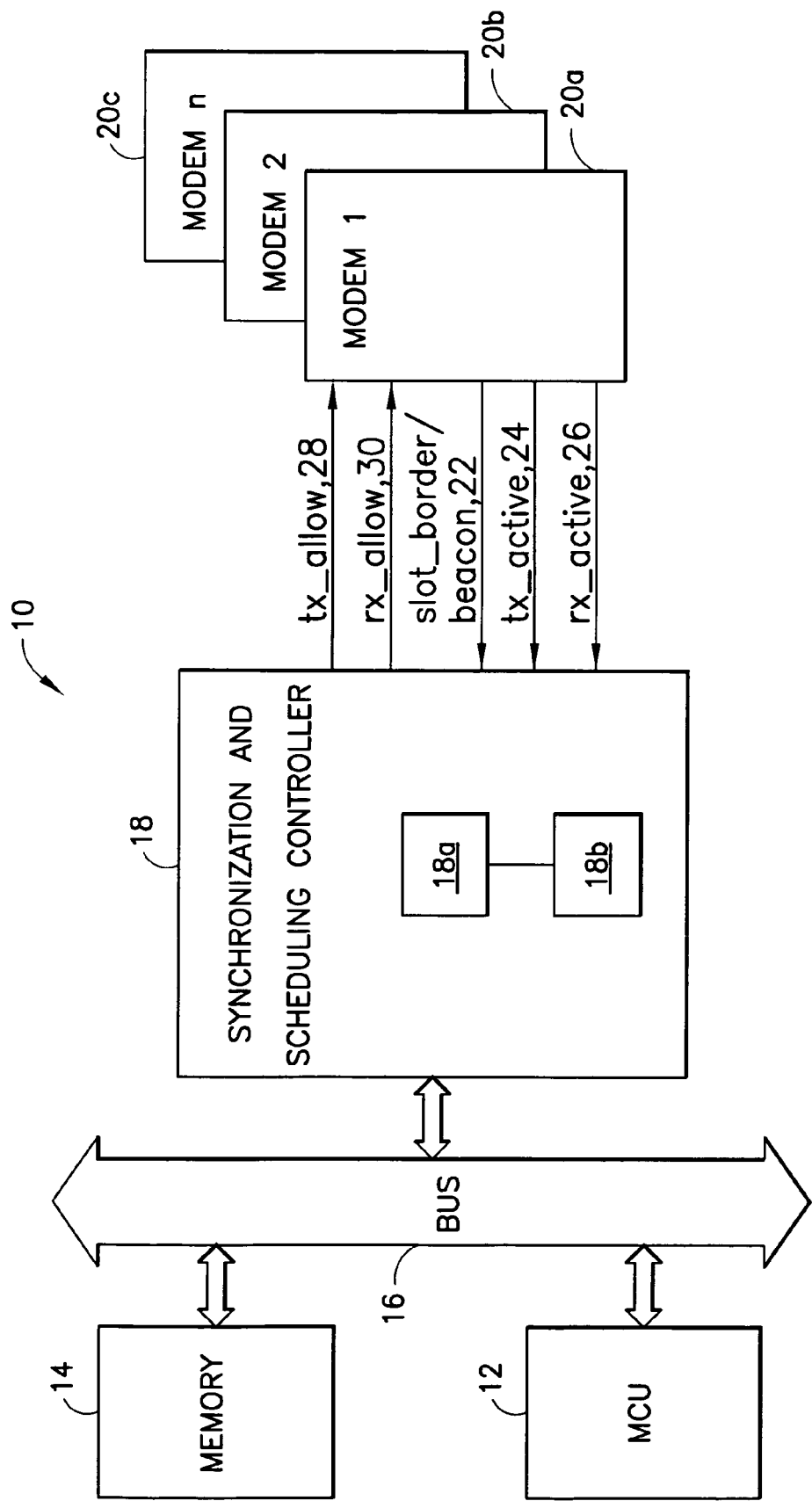
FIG. 1 shows a simplified block diagram of components of a device in accordance with an exemplary embodiment of the invention.

FIG. 1 illustrates a simplified block diagram of a multiradio device 10 incorporating the SSC functions within an ASIC/ASIP. Specifically, a MCU 12 is coupled to a memory 14 through a bus 16. Alternatively, the memory 14 may be a part of the MCU 12 such as a random access memory RAM. The SSC 18 is shown as an ASIC/ASIP disposed between the MCU 12 and various modems 20a, 20b, 20c. There may be two or more modems, indexed by n=1, 2, . . . N. Various signals between the modems 20a, 20b, 20c and the SSC 18 are representative of signals between the SSC and an individual modem. Each modem 20a, 20b, 20c signals to the SSC 18 its slot border by a slot border beacon 22. The slot border is determined by the particular network over which that modem communicates. As noted above, some modem protocols do not use a regular traffic unit such as slots. For these protocols the slot border is replaced with the smallest network element, which in the case of WLAN is the beacon signal.

Each modem 20a, 20b, 20c further signals to the SSC 18 specific instances in which it is authorized to transmit or receive by whatever transmission protocol is used by that modem's network. (FIG. 3b describes an instance where only one tx or rx signal is necessary to resolve multiple transmit/receive authorizations.) These signals are indicated as a transmit (tx) active signal 24 and a receive (rx) active signal 26. The SSC 18 uses the slot border beacons 22 to map each modem to a common reference time, builds a schedule of transmission and reception active times/slots for each modem, and determines where instances of potential interference might occur. For example, assume modems 20a and 20b use overlapping frequencies but modem 20c does not. The SSC 18 need not inhibit transmissions or receptions for an active transmission or reception slot that overlaps as between modems 20a and 20c (or 20b and 20c), but need be concerned only with such active slot overlaps as between modems 20a and 20b since only there is a potential for self-interference among modems of the same device 10. The SSC can perform its comparison of modem schedules, regardless of the different clocks used by each modem 20a, 20b, 20c, because those schedules are mapped in the SSC 18 to a common clock, termed herein a master clock. A convenient common clock might be the system clock for the device 10, such as that referenced by the MCU 12. Other embodiments may find the SSC 18 using one of the modem clocks as a master clock, to which the other schedules from other modems are justified.

Using the various schedules mapped to a master clock, the SSC 18 then sends to each modem a transmission allow signal 28 and a reception allow signal 30, indicating for each slot, or for each authorized active slot as reported in signals 24, 26, whether or not that particular modem is inhibited or not inhibited from transmitting/receiving during that slot. This allow/inhibit signal 28, 30 is over and above any authorization given the modem by the network, so that where two modems that may potentially interfere are both authorized to be active for a time slot that overlaps with the other, one of them will be inhibited by the transmit allow/inhibit signal 28 and/or the receive allow/inhibit signal 30. While the invention is detailed with respect to allow/inhibit signals 28, 30 from the SSC 18 to one of two modems 20a, 20b, 20c that potentially overlap, it is understood that for the case of three or more overlapping active slots for potentially interfering modems, the SSC 18 sill send inhibit signals to all but one of those modems 20a, 20b, 20c.

In an embodiment, the SSC 18 maps the slot border beacons 22 from the various modems 20a, 20b, 20c to a master clock by means of a synchronization table 32, the format of which is shown in FIG. 2. While this is described as one synchronization table for one modem, it is understood that a synchronization table is generated for each modem, and the same information may be combined into a unified table and stored as such. For simplicity a single table per modem is detailed. It is advantageous that the SSC 18 write the synchronization table(s) to the memory 14 for ready access by the MCU 12, which is in fact in overall control of the modems 20a, 20b, 20c. Direct control by the SSC 18 over the modems is limited to the allow/inhibit signals 28, 30; other control signals originating at the MCU 12 may be merely passed through the SSC 18 unchanged, or alternatively modified as necessary to reflect the described allow/inhibit signals 28, 30 but otherwise passed through if not modified. Direct allow/inhibit signals 28, 30 are seen as simpler in that the other control signals from the MCU 12 are generally not time-critical to the clocks of the modems, unlike the allow/enable signals 28, 30.

The synchronization table 32 of FIG. 2 shows four distinct fields: an initial tick field 34, a table size field 36, a cycling field 38, and a plurality of slot/traffic border element fields 40a through 40x. The initial tick field 34 field tells the absolute time value, at which this table 32 becomes valid. The table size field 36 indicates how many traffic element border fields (40a to 40x) there are in this table 32. The cycling field 38 indicates whether the table 32 is valid after the time instant given by adding the initial tick field 34 to the number of slot/traffic element border fields 40a to 40x (initial tick+table size). That is, if the table cycle field 38 indicates cycling, the synchronization table 32 is re-used. If the table 32 is cycling, it can be used indefinitely. Each slot/traffic element border field 40a to 40x indicates whether there is a slot border timed (in the modem 20a, 20b, 20c to which this synchronization table 32 applies) at the tick instant given by the position of that slot/traffic element 40a, . . . 40x (e.g., at time initial tick+element index).

Figure 3A:
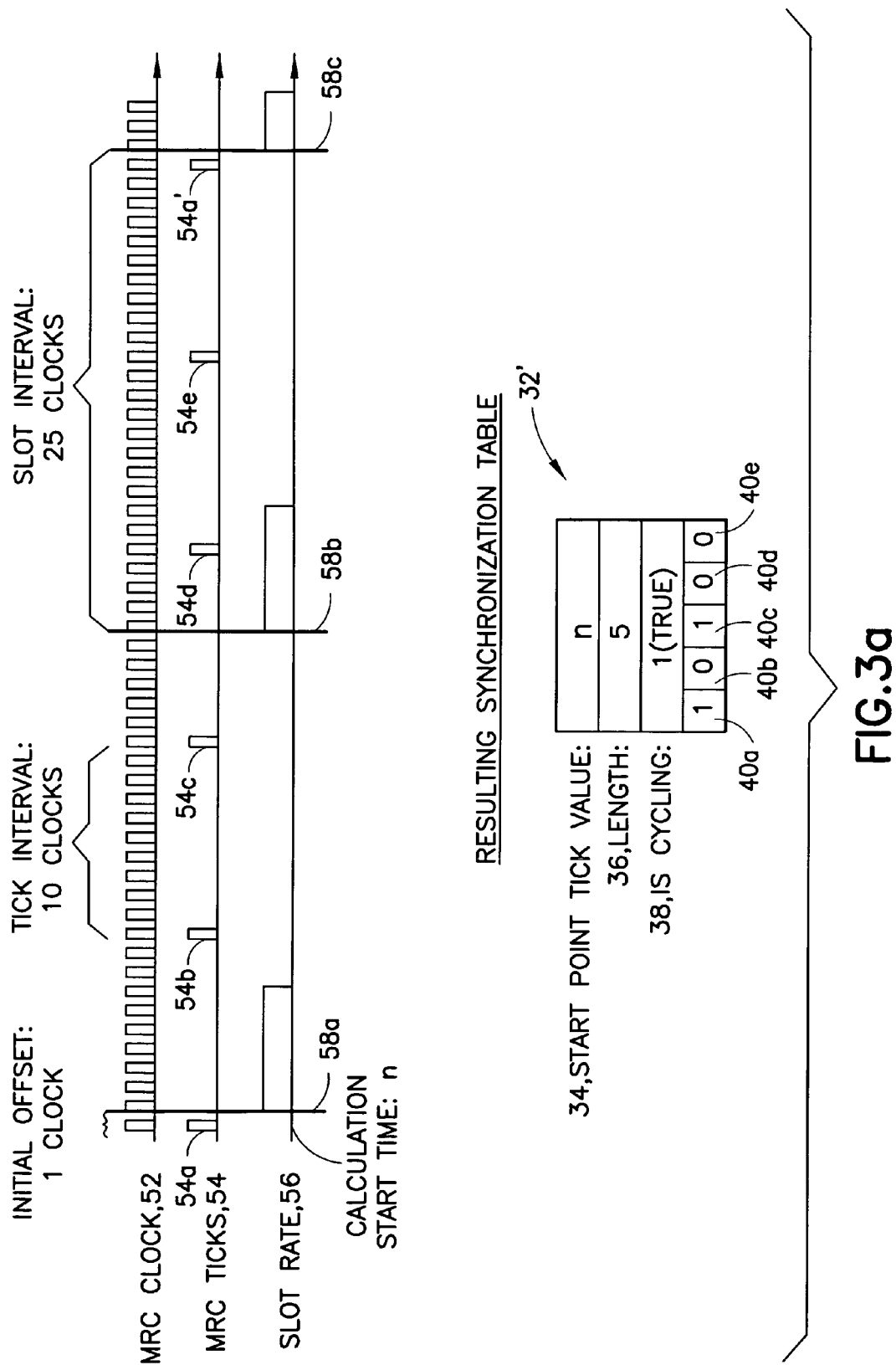
FIG. 3a illustrates a timing diagram and a resulting synchronization table following the format shown in FIG. 2 for one modem according to an exemplary embodiment of the invention for one type of network scheduling architecture.

FIG. 3a is an example of how the fields in a synchronization table 32 may be computed by the SSC 18. The timing diagram at the top of the FIG. 3a shows an MRC clock 52 and MRC ticks 54 spaced at intervals of ten clock cycles. A convenient interval for the MRC ticks 54 may be chosen based on the slot intervals of the various networks accessed by the multiradio device 10, or an arbitrary integer may be used with some minimal increase in SSC calculation. The slot border beacon 22 from one of the modems indicates to the SSC where the slot boundaries are located for that modem's network, which in the timing diagram at the top of FIG. 4 are plotted as 58a, 58b and 58c. If the slot border beacon 22 is not present in a system described herein, the same information may be extrapolated from the activity signals. In that case, the slot border measurement requires modem traffic. Note that the modem reporting its slot boundary beacon is not reporting with reference to the MRC clock 52 or its ticks 54; the SSC 18 maps those boundaries 58a, 58b, 58c to the chosen master clock as shown in that timing diagram. Consider the start time for the synchronization table 32' being generated as indicated in the timing diagram, the first illustrated MRC clock tick 54a. Between the first tick 54a and the second 54b is a slot boundary 58a, so the slot/traffic border element field 40a corresponding to that first tick 54a is set with bit-on in the synchronization table 32'. Between the second tick 54b and the third tick 54c are no slot boundaries, so the slot/traffic border element 490b corresponding to that second tick 54b is bit-off. A second boundary 58b lies between the third 54c and fourth 54d ticks, so the corresponding slot/traffic border element 40c is bit-on. No boundaries lie between the fourth 54d and fifth 54c ticks, nor between the fifth tick 54e and the next subsequent tick 54a', so those respective corresponding slot/traffic border fields 40d, 40e are set bit-off. Since in this instance the tick interval was set at ten cycles of the MRC clock 52, which is convenient for this network's slot interval of 25 cycles of the MRC clock 52 (recognizing that the network is not timed to the MRC clock 52), the synchronization table 32' can repeat, so its cycling field 38 is set bit-on to indicate cycling. The cycle repeats after five MRC ticks 54, because five MRC ticks 54 correspond exactly to two full slot intervals of the network. Therefore, there are five slot/traffic border elements 40a to 40e, and the next subsequent MRC tick 54a' corresponds to the first slot/traffic border field 40a. The synchronization table 32' is generated and re-used cyclically until a change is received from the network. Such a change will typically arise not from a different slot interval, but from changing peers/controlling entities in the network so that the boundary under the new peer/entity is not exactly aligned with that of the former peer/entity. A slip of one MRC cycle 52 would cause a new table to be generated with different entries in the slot/traffic boundary fields 40a-40e, though the table length 36 and cycling 38 fields may be regenerated with the same values as before. The slot rate 56 here represents the maximum granularity of the selected radio network's physical data elements. If a traffic element cannot be segmented anymore in a modem, it can be labeled as a 'slot'. MRC tick rate 54 is selected so that for any modem in the Multiradio device the tick interval is smaller than slot interval.

As will be appreciated, the synchronization table 32' maps a set of timeslots (indicated by the boundaries 58a, 58b, 58c) for one of the modems 20a, 20b, 20c to a selected master clock, in this case the ticks 54a to 54e of the MRC 12. FIG. 3a show that the MRC 12 knows, by reading the synchronization table written by the SSC 18 to the memory 14, exactly when a slot border happens in a modem. By logging specific and deterministic delays between the slot border 58a, 58b, 58c and a related MRC tick 54a-54e to a register, the precise instant of the border slot time is known to the individual MRC clock cycle 52. In refined embodiments, then overlapping periods of authorized transmit/receive activity can be plotted against one another rather than the less precise authorized slot intervals in order to determine whether an overlap occurs.

Now consider the scheduling table 42, of which an exemplary format is shown in FIG. 4. Certain fields are similar to those in the synchronization table 32 of FIG. 2. Specifically, the scheduling table 42 consists of an initial tick field 44, table size field 46, cycling field 48, and a number of tx allowed/blocked 50a to 50y and rx allowed/blocked 502a to 52y field pairs that equals the value in table size field. These field pairs originate the tx allow/inhibit signal 28 and the rx allow/inhibit signals 30 described with reference to FIG. 1. The initial tick field 44 tells the absolute time value at which this scheduling table 42 becomes valid. The table size field 46 indicates how many traffic element border field pairs 50a/52a to 50y/52y there are in this table. The cycling field 48 indicates whether the table is valid after the time instant initial tick+table size has passed. If the table is cycling, it can be used indefinitely. Unlike the synchronization table 32, if the scheduling table 42 is not cycling, the last table value pair 50y/52y remains as the modem's scheduling state until a new schedule is set. For example, if a scheduling table 42 is non-cycling and the last value pair is rx allowed, tx blocked, the modem to which this scheduling table applies is not allowed to transmit at all until a new schedule is generated. The tv allowed field (50a to 50y) indicates whether the MRC 12 allows this modem to transmit at the slot corresponding to the position of that tx allowed field (50a to 50y). The rx allowed field (52a to 52y) indicates whether the MRC 12 allows that modem to receive during the slot corresponding to that field's position.

Figure 5:
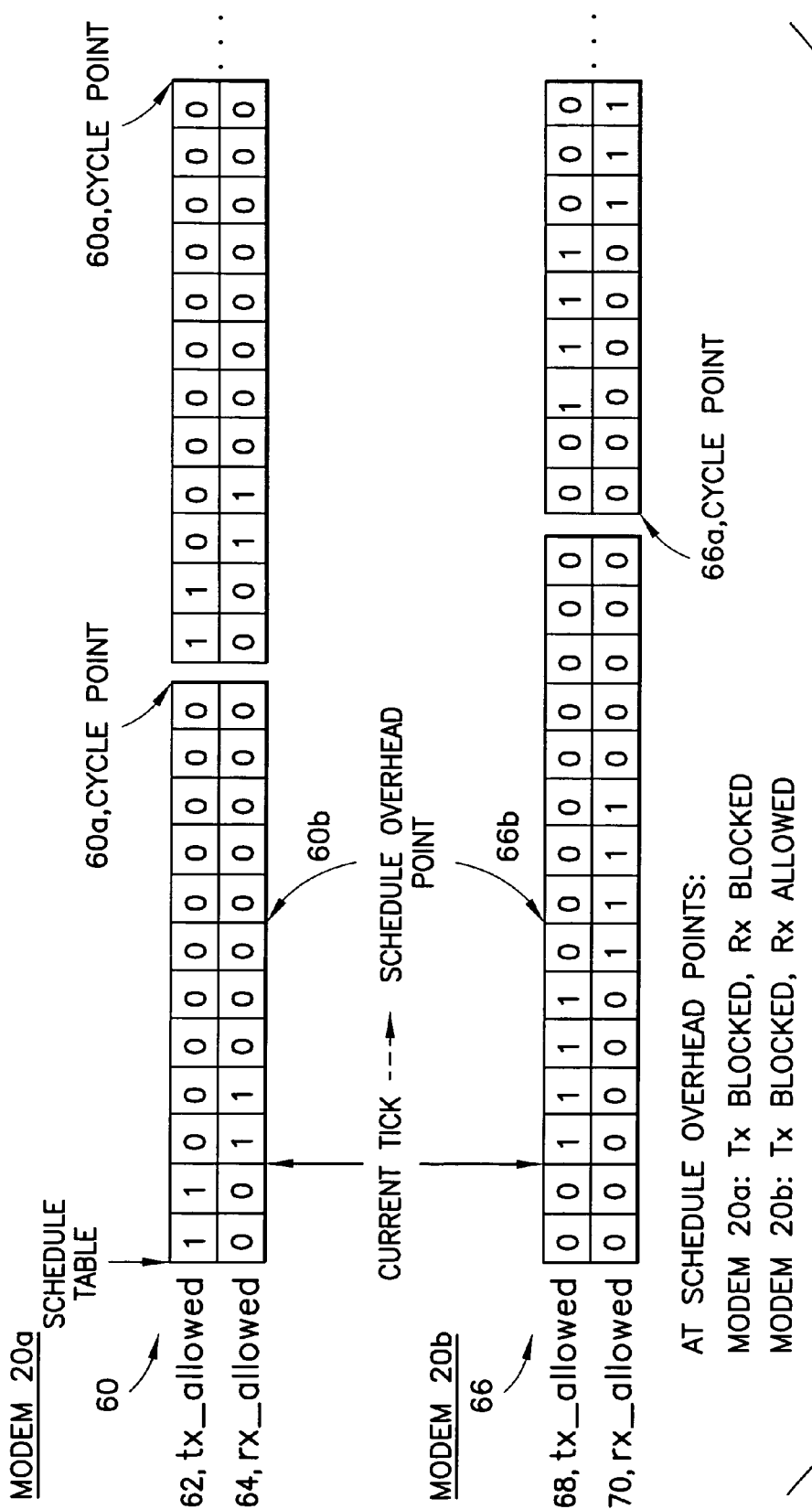
FIG. 5 illustrates two scheduling tables following the format of FIG. 4 for two of the modems of FIG. 1 according to an exemplary embodiment of the invention.

At FIG. 5 is shown the tx allow/inhibit signals 28 and the rx allow/inhibit signals 30 described with reference to FIG. 1 as drawn from two distinct scheduling tables 42. In this example the scheduling tables 42 for a first modem 20a and a second modem 20b each repeat. A first modem 20a has one cycling schedule, which as shown repeats every twelve MRC ticks. There are then twelve field pairs in its corresponding scheduling table 42. The illustrated bit sequence 60 for the first modem have pairs of tx and rx signals from the SSC 18, and represent those signals as sent seriatim to the first modem 20a. The bits in the tx allowed row 62 represent the tx allow/inhibit signals 28 from FIG. 1, with bit-on (1) indicating that transmission is allowed from that modem during the slot corresponding to that bit position, and bit-off (0) indicating inhibit transmission for that first modem during the corresponding slot. Similarly for the rx allowed row 64, which represents the rx allow/inhibit signals 30 of FIG. 1 for receive functions of the first modem 20a. It is seen that the bit sequences repeat after each cycle point 60a for the first modem 20a.

The illustrated bit sequence 60 for the second modem 20b of the same device 10 has another cycling schedule, which is seen to repeat each fifteen MRC ticks meaning that there are fifteen tx/rx pairs in its underlying scheduling table 42. Both bit sequences 60, 66 have a schedule overhead value, which they use to compensate the latencies in the system during traffic scheduling and thereby eliminate the bus arbitration problem. At the schedule overhead point 60b of the first modem 20a, it is seen that transmission and reception is inhibited for the first modem 20a, transmission is inhibited for the second modem 20b and reception is allowed for the second modem 20b. The same allow/inhibit signals are set for the scheduled overhead point 66b of the second modem 20b. The bit sequences 60, 66 are aligned in time vertically according to MRC ticks. It can be seen that with two exceptions there is no bit-on set for the same MRC tick for two rows 62, 64, 68, 70. Such is a simple embodiment: no two authorized/network scheduled slots are enabled at the same time, at least for potentially interfering modems. For that simple case, in all instances where a transmission or reception is allowed, all other instances of transmission and reception are inhibited by a bit-off in the tx or rx allowed signal. A reverse bit convention may also be used.

In some embodiments it may not be necessary to inhibit both transmission and reception of one modem in response to allowing an authorized transmission and/or reception on another modem; the invention may restrict only those instances of reception and/or transmission that would interfere with another modem's transmission and/or reception if allowed. This is illustrated at the first two ticks following the "current tick" notation in FIG. 5, and is particularly pertinent when one or both networks associated with the otherwise overlapping modems use different frequency bands for transmit and receive functions. In each of those two ticks, the first modem 20a is enabled to receive and the second modem 20b is enabled to transmit. In this instance, reception on the first modem 20a is not potentially interfering with transmission from the second modem 20b, such as due to a frequency separation between those different bands. Only overlap of two active instances that are potentially interfering need be restricted; else authorized transmit and receive slots go unused for no true gain. Further to frequency interference, the allow/inhibit signals 28, 30 may also be used to inhibit conflicting use of hardware in the device, such as where two modems share an antenna that is not configured for simultaneous operation over two different frequencies that the two sharing modems may use. Each of these variations is more specific to device hardware and the variances as between different networks. The more broad-based embodiments, not specific to a device or the networks on which its modems operate, are those that inhibit all transmit/receive activity whenever there is an overlapping authorized timeslot among different modems, except for either transmit or receive activity for one of the modems.

Figure 6A:
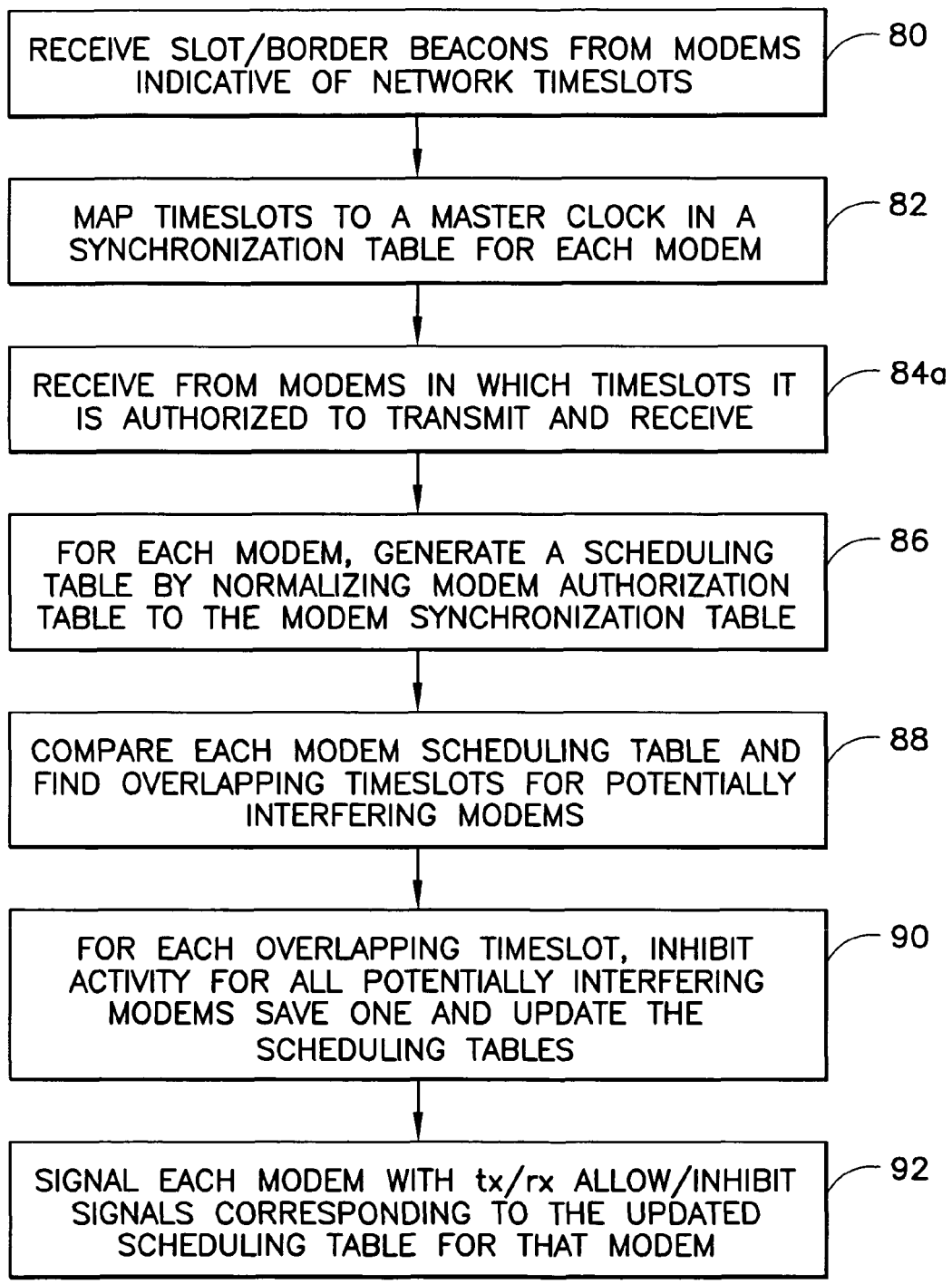
FIG. 6a illustrates process steps for synchronizing and scheduling modems of a multiradio device according to an exemplary embodiment of the invention where modem traffic authorization pattern is generated by measuring modem behaviour.
Figure 6B:
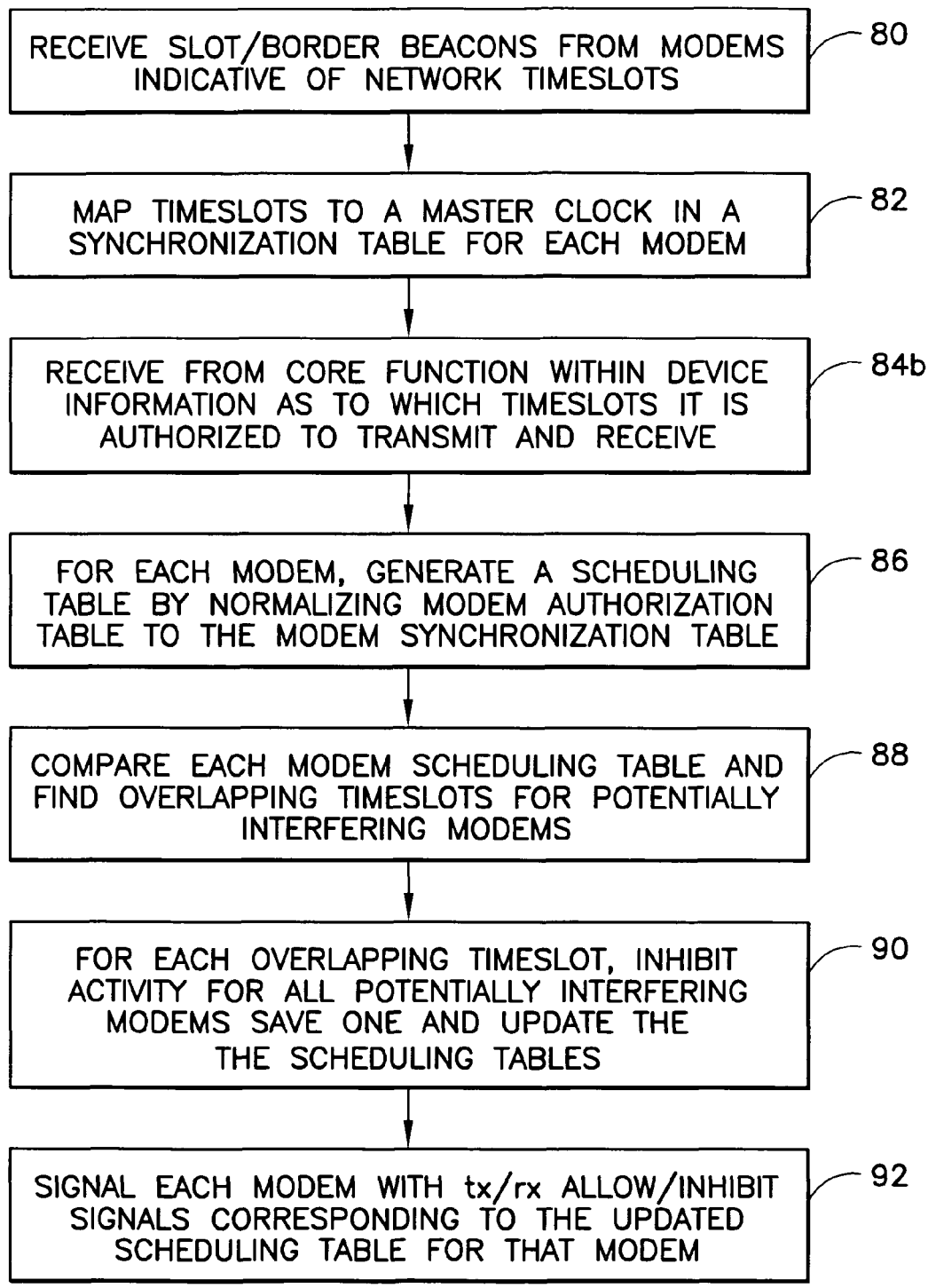
FIG. 6b illustrates process steps for synchronizing and scheduling modems of a multiradio device according to an exemplary embodiment of the invention where modem traffic authorization pattern is received from an existing storage in the device.

FIG. 6a shows process steps according to a particular embodiment where modem provides the MRC its traffic authorization information. FIG. 6b shows a similar set of process steps in a system where the modem's authorization pattern is known already in MRC during modem connection setup. At block 80, the SSC 18 receives a slot border beacon from each of the modems, which indicate the timeslot boundaries for the network on which that modem is currently communicating. At block 82, the SSC maps the timeslot information received at block 80 to a master clock, such as the MRC clock seen in FIG. 3a to which the MCU 12 is synchronized, thereby generating the synchronization tables 42. At block 84a, the SSC 18 receives from each modem information concerning which timeslots the network has authorized the modem to transmit and to receive, generically those timeslots in which the subject modem is authorized to be active. Using the information of block 84a, at block 86 the SSC 18 generates for each modem a scheduling table of authorized activity, though this is not yet the described scheduling table. The SSC may load this non-final scheduling table into its internal buffer prior to sending an updated version to the memory 14. The scheduling tables at block 86 are normalized to the synchronization tables. The scheduling tables are compared at block 88 and overlapping timeslots for potentially interfering modems are found. The tables are normalized using the MRC tick domain as described as well as the scheduled overhead point, so this normalization may be done in part at least at block 82 where the tick domain is used rather than merely mapping to the MRC clock directly. At block 90, the scheduling tables from block 86 are updated to inhibit activity for all potentially interfering modems for each of the potentially interfering timeslots from block 88. This is preferably written to both the SSC 18 internal RAM 18a and the memory 14 that is directly accessible by the MCU 12. At block 92, the SSC 18 signals each modem with the transmit allow/inhibit signals and receive allow/inhibit signals seen in FIG. 1. Those signals are drawn directly from the tx/rx field pairs of the updated scheduling tables according to the embodiments detailed above.

In the transmission/reception allocation architecture which uses operation steps shown in FIG. 6a, the SSC monitors modem signals 24 and 26 for a duration determined by MRC as indicated in step 84a, one measurement per a positive beacon border edge 22. The SSC places the raw measured information in table 42 that is located in the common memory 14. The starting instant of the measurement is placed in the initial tick-field 44. The duration of the measurement is placed in the table size-field 46. Is cycling-field 48 is set to 'false'. For each slot border beacon 22, the value in the tx active 24 and rx active 26 signals are placed in table slots 50 and 52 respectively. At the first border beacon 22 after the measurement start the tx and rx activity values are placed in 50a and 52a, at second beacon in 50b and 52b and so on until as many beacons have been received as indicated by the table size-field 46. When the measurement period is over the MRC seeks a repeating pattern from the information in table 42. When the pattern is found, the table size-field is set to the size of the repeating pattern, the is cycling-field 48 is set to 'true' and the fields in table 42 starting from 50x, 52x, where x is greater than the value in table size-field are discarded. The SSC can now use the table 42 as a valid authorization table.

In the transmission/reception allocation architecture which uses operation steps shown in FIG. 6b, the monitoring routine described in the previous paragraph is not necessary. The authorization table is received from the element that configures MRC or alternatively from a database within MRC at step 84b.

Figure 3B:
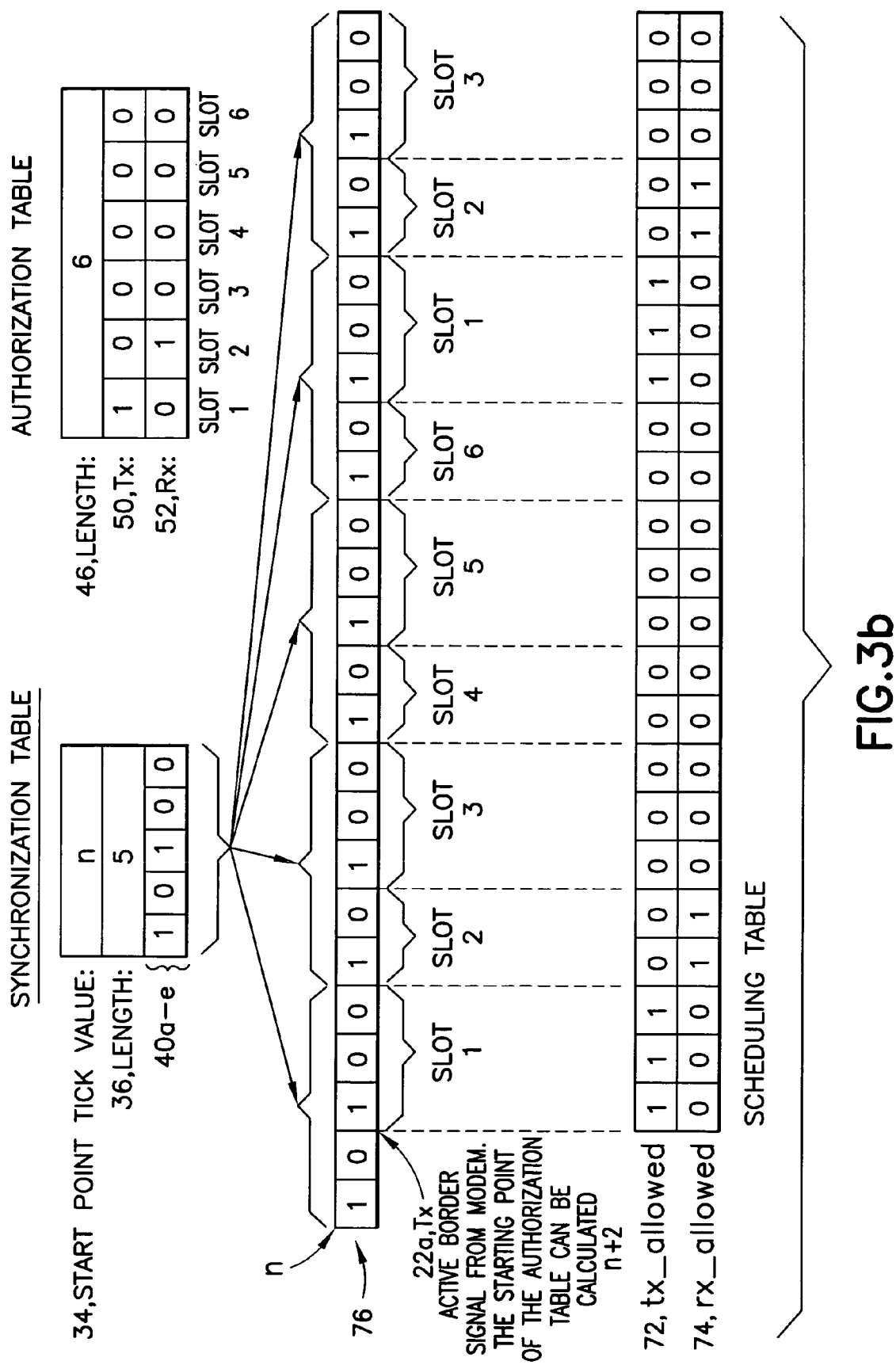

During the step 86 MRC core functions map the authorization tables 42 for each modem connection to the modem's synchronization table 32. This method can be used, for example, for the Bluetooth protocol as shown in FIG. 3b. As an example case, Bluetooth data may be sent over an HV3 link, which is an SCO (synchronous connection oriented) type of link that partitions traffic into groups of slots (six slots shown in FIG. 3b). Slots 1, 3 and 5 are data transmission slots for the master device, and slots 2, 4 only one slave device. In HV3, slot 1 is used by the master device to send data to the slave device, slot 2 is used by the slave device to send data to the master device, and the remaining slots 3-6 are not used, unless/until other slave devices are added to this network. This pattern repeats every six slots. Whether master or slave, there is no signaling over the network for each authorized transmission or reception slot. What is transmitted is the network timing so that devices/modems on the network can synchronize their six-slot patterns, but each device knows its designated slot to transmit and receive once the Bluetooth connection is set up. The transmission allocation pattern that indicates which device transmits and receives in which slots is stored in a local memory. FIG. 3b shows that authorization table for the master device using the master/slave example given above: transmit is allowed (bit=1) and reception is inhibited (bit=0) in slot 1 since that is when this master is allowed to transmit to the (single) slave, reception is allowed and transmission is inhibited in slot 2 since that is when the slave is authorized to transmit to this master, and slots 3-6 are not used and are therefore inhibited. The initial tick field 44 and cycling field 48 are not shown in this authorization table though they may be included in an embodiment. The resulting synchronization table is shown, with the cycling field 38 not shown (in this type of network allocation structure, the table would always cycle until replaced, such as when a new slave joins the network). There are five border elements 40a-e that cycle every tick, shown in the tick diagram 76 as repeating.

Assume the connection is setup at tick=n and slot 1 begins at tick=n+2, shown as a transmission active signal 22a for the master device/modem. The border elements 40a-e repeat each five ticks. The bit sequences for transmission 72 and reception 74 are shown aligned with the tick diagram 76. In slot 1 for this master device, transmission is allowed (bit=1) and reception is inhibited (bit=0) for the three ticks that span slot 1, following the first tx/rx pair of the authorization table that correspond to slot 1. Slot 2 spans two ticks, and the second pair of tx/rx bits from the authorization table are repeated in the sequences 72, 74 across those two ticks so as to span all of slot 2. Slots 3-6 are all inhibited for transmission and reception, consistent with the tx/rx pairs corresponding to those slots in the authorization table. The transmission 72 and reception 74 bit sequences then repeat at the next tick in the tick diagram 76, which corresponds to the next instance of slot 1 in that network.

As stated earlier, a similar procedure 86 is repeated for each modem connection. When the step 86 is completed, SSC has a scheduling table (such as in the bottom of FIG. 3b) for each modem. These scheduling tables may vary in their sizes, starting values and patterns. However, they now all share a common time reference (MRC tick) and thus may be compared with each other as shown in FIG. 5.

Because embodiments of this invention resolve and prevent interference among modems operating on disparate networks, the different aspects of FIGS. 6a and 6b can be readily combined into one embodiment, where one modem operates in a first network allocating on a per-transmission basis (FIG. 3a) and another modem operates in a second network allocating according to a repeating schedule that is authorized upon connection setup (FIG. 3b).

Following are some implementation details that may be present in various embodiments. The connection between the SSC 18 and the memory 14 may be via the illustrated bus 16 or it may be direct. Latencies can be non-deterministic, only a maximum delay need be known as in the above detailed embodiments. The connection with the modems needs to be such, that all signals to and from SSC have a known delay, which is accounted for in the signals 28, 30 sent to the specific modem 20a, 20b, 20c.

The SSC 18 may be considered to functionally maintain the master clock tick domain, which in FIG. 3a is an MRC tick 54. As above, the tick is a time unit (in the MRC 12) to which all the modems' behavior is mapped for purposes of synchronizing under embodiments of this invention. As above, the synchronization table's traffic element border fields 40a-40x represent the modem's status during a single tick. The SSC 18 generates the synchronization table 32 by monitoring the signals 22, 24, 26 that it receives from the modems 20a, 20b, 20c. The synchronization table 32 is written to the common memory 14, from where MRC 12 core functions may read it.

The SSC 18 also schedules each modem with the tx allow/inhibit signals 28 and rx allow/inhibit signals 30, which are drawn from the scheduling table 42 for that modem. The scheduling table 42 may be generated by the MRC core functions and written to the common memory 14. The SSC may reads the table—or a piece of it—to its internal buffer 18a. An internal buffer 18a is advantageous, because the information needed to schedule the modems needs to be available immediately during the scheduling operation. The buffer control 18b inside the SSC 18 maintains valid scheduling information in the buffer 18a while the schedule routine (in hardware, software, or a combination) signals each modem their current schedule statuses, the signals 28, 30. The statuses are acquired by looking in the scheduling tables 42 at the index, where current time (or current tick, see FIG. 5) equals the table's initial tick (field 44), plus the traffic element border field index (the current one of the tx/rx pairs 50a/52a to 50y/52y), plus the modem's schedule overhead value. The schedule overhead value is modem-specific and is used to compensate any known latencies caused in the system by the relative interconnections of the SSC 18 to the modems 20a, 20b, 20c. Since these latencies are relatively fixed once the device 10 is assembled, it need be computed only once for each different type of device 10 into which an otherwise generic SSC 18 ASIC/ASIP is installed, so bus arbitration is easily addressed for different type multiradio devices 10.

In general, the various embodiments of the device 10 can include, but are not limited to, cellular phones, cellular communicators, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

Embodiments of this invention may be implemented in part or in whole by computer software executable by a data processor such as the SSC 18 or the MCU 12 of the device 10, or by hardware, or by a combination of software and hardware. Such software may be embodied on a computer readable medium such as the memory 14 or an internal memory of the SSC (in addition to the buffer 18a), and when executed by an associated data processor enable the multiradio device 10 to operate in accordance with the exemplary embodiments of this invention.

The memory 14, 18a may be of any type suitable to the local technical environment and may be implemented using any suitable data storage technology, such as semiconductor-based memory devices, magnetic memory devices and systems, optical memory devices and systems, fixed memory and removable memory. The processor MCU 12 and/or SSC 18 may be of any type suitable to the local technical environment, and may include one or more of general purpose computers, special purpose computers, microprocessors, digital signal processors (DSPs) and processors based on a multi-core processor architecture, as non-limiting examples.

Based on the foregoing it should be apparent that the exemplary embodiments of this invention provide a method, apparatus and computer program product to map a first set of timeslots for a first modem of a device to a master clock, to map a second set of timeslots for a second modem of a device to the master clock, and to inhibit at least one of transmission and reception of the first modem during a timeslot of the first set that overlaps with a timeslot of the second set. Note that the timeslots need not be designated as formal 'slots' in the associated network, and the sets need not be received all at once; individual slots of a set may be allocated individually by the network as in FIG. 3a on an as needed or an as requested basis.

In general, the various embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method comprising:
  receiving signals, at a controller within an apparatus, from two or more radio modems operating within the apparatus, each of the signals including indications of timeslots indicating when a radio modem initiating a respective signal is authorized to communicate in a network, the timeslots based on a clock reference relative to timing of the network in which the radio modem initiating the respective signal operates;
  mapping the received timeslots to a common reference time;
  identifying overlapping timeslots on the common reference time; and
  scheduling operation of the two or more radio modems having overlapping timeslots on the common reference time by inhibiting at least one of transmission or reception of one or more radio modems during an authorized timeslot that overlaps with an authorized timeslot of another radio modem.

2. The method of claim 1, further comprising:
  determining in which of a first set of timeslots a first radio modem is authorized to be active;
  determining in which of a second set of timeslots a second radio modem is authorized to be active,
  wherein the first radio modem is authorized to be active by a first network and the second radio modem is authorized to be active by a second network.

3. The method of claim 2, wherein determining in which of the first set of timeslots the first radio modem is authorized to be active comprises one of receiving from the first radio modem or determining from a locally stored first traffic allocation pattern a schedule of first authorized activity;
  wherein determining in which of the second set of timeslots the second radio modem is authorized to be active comprises one of receiving from the second radio modem or determining from a locally stored second traffic allocation pattern a schedule of second authorized activity; and
  wherein inhibiting comprises generating a first radio modem scheduling table from the schedule of first authorized activity having for each timeslot a transmit field and a receive field, and placing in one of the transmit or receive fields corresponding to the said inhibited timeslot an inhibit indicator based on a comparison of the schedules of first and second authorized activity.

4. The method of claim 1, wherein inhibiting comprises sending to the one or more radio modems at least one of a transmit inhibit signal or a receive inhibit signal.

5. The method of claim 1, wherein inhibiting comprises signaling the one more radio modems with an inhibit signal that is offset from a master clock from which the common reference time is derived an amount that compensates for a time overhead difference between the one or more radio modems and the another radio modem.

6. The method of claim 1, wherein mapping the received timeslots comprises creating at least one synchronization table that maps a tick domain of a master clock from which the common reference time is derived to timeslot borders of a first set of timeslots corresponding to a first of the radio modems and to timeslot borders of a second set of timeslots corresponding to a second of the radio modems.

7. The method of claim 1, wherein at least one of the timeslots is generated from a timing signal and a predetermined transmission allocation pattern, where the timing signal is one of sent from or received at one of the two or more radio modems.

8. The method of claim 1, wherein the mapping uses at least a first beacon communicated from a first radio modem and at least a second beacon communicated from a second radio modem.

9. The method of claim 8, wherein at least one of the first or second beacons defines a slot border or a beacon signal.

10. A device comprising:
  a memory;
  two or more radio modems;
  at least one processor coupled to the memory and to each of the first and second radio modems;
  wherein the at least one processor is configured to receive signals from the two or more radio modems, each of the signals including indications of timeslots indicating when a radio modem initiating a respective signal is authorized to communicate in a network, the timeslots based on a clock reference relative to timing of the network in which the radio modem initiating the respective signal operates; to map the received timeslots to a common reference time, to identify overlapping timeslots on the common reference time; and to schedule operation of the two or more radio modems having overlapping timeslots on the common reference time by inhibiting at least one of transmission or reception of one or more radio modems during an authorized timeslot that overlaps with an authorized timeslot of another radio modem.

11. The device of claim 10, wherein at least one of the received signals comprises a connection setup time signal and a transmission allocation pattern stored in the memory is used to identify overlapping timeslots on the common reference time signal.

12. The device of claim 10, wherein the at least one processor is further configured to:
  determine, from signaling received from a first modem or a first transmission allocation pattern stored in the memory, which of the timeslots the first radio modem is authorized to be active; and
  determine, from signaling received from a second modem or a second transmission allocation pattern stored in the memory, which of the timeslots the second radio modem is authorized to be active;
  and is configured to inhibit at least one of transmission or reception of the first radio modem only for those authorized timeslots during which both the first and second radio modems are authorized to be active.

13. The device of claim 12, wherein one of the signaling received from the first radio modem or the first transmission allocation pattern comprises a schedule of first authorized activity;
   wherein one of the signaling received from the second radio modem or the second transmission allocation pattern comprises a schedule of second authorized activity; and
   wherein the at least one processor is configured to inhibit the at least one of transmission or reception of the first radio modem by generating a first radio modem scheduling table from the first schedule of authorized activity having for each timeslot a transmit field and a receive field, and placing in one of the transmit or receive fields corresponding to the said inhibited timeslot an inhibit indicator based on a comparison of the schedules of first and second authorized activity.

14. The device of claim 10, wherein the at least one processor is configured to inhibit by sending to the one or more radio modems one of a transmit inhibit signal or a receive inhibit signal.

15. The device of claim 10, wherein the at least one processor is configured to inhibit by signaling the one or more radio modems with an inhibit signal that is offset from a master clock from which the common reference time is derived an amount that compensates for a time overhead difference between the one or more radio modems and the another radio modem.

16. The device of claim 10, wherein the at least one processor is configured to map the received timeslots by creating at least one synchronization table that maps a tick domain of a master clock from which the common reference time is derived to timeslot borders of a first set of timeslots corresponding to a first of the radio modems and to timeslot borders of a second set of timeslots corresponding to a second of the radio modems.

17. The device of claim 10, wherein the at least one processor is further configured to use at least a beacon communicated from a first radio modem and to use at least a beacon communicated from a second radio modem to map the received timeslots.

18. The device of claim 17, wherein at least one of the first or second beacons defines a slot border or a beacon signal.

19. A computer program product, embodied on a computer readable non-transitory storage medium, comprising instructions to cause a digital processor to perform actions directed toward scheduling radio modems within a device, said actions comprising:
   receiving signals, at a controller within an apparatus, from two or more radio modems operating within the apparatus, each of the signals including indications of timeslots indicating when a radio modem initiating a respective signal is authorized to communicate in a network, the timeslots based on a clock reference relative to timing of the network in which the radio modem initiating the respective signal operates;
   mapping the received timeslots to a common reference time;
   identifying overlapping timeslots on the common reference time; and
   scheduling operation of the two or more radio modems having overlapping timeslots on the common reference time by inhibiting at least one of transmission or reception of one or more radio modems during an authorized timeslot that overlaps with an authorized timeslot of another radio modem.

20. The computer program product of claim 19, wherein the actions further comprise:
   determining in which of a first set of timeslots a first radio modem is authorized to be active;
   determining in which of a second set of timeslots a second radio modem is authorized to be active;
   wherein inhibiting at least one of transmission or reception of the one or more radio modems is limited to authorized timeslots during which both the first and second radio modems are authorized to be active; and
   wherein the first radio modem is authorized to be active by a first network and the second radio modem is authorized to be active by a second network.

21. The computer program product of claim 20, wherein determining in which of the first set of timeslots the first radio modem is authorized to be active comprises one of receiving from the first radio modem or determining from a locally stored first traffic allocation pattern a schedule of first authorized activity;
   wherein determining in which of the second set of timeslots the second radio modem is authorized to be active comprises one of receiving from the second radio modem or determining from a locally stored second traffic allocation pattern a schedule of second authorized activity; and
   wherein inhibiting comprises generating a first radio modem scheduling table from the schedule of first authorized activity having for each timeslot a transmit field and a receive field, and placing in one of the transmit or receive fields corresponding to the said inhibited authorized timeslot an inhibit indicator based on a comparison of the schedules of first and second authorized activity.

22. The computer program product of claim 19, wherein inhibiting comprises signaling the one or more radio modems with an inhibit signal that is offset from a master clock from which the common reference time is derived an amount that compensates for a time overhead difference between the one or more radio modems and the another radio modems.

23. The computer program product of claim 19, wherein mapping the received timeslots comprises creating at least one synchronization table that maps a tick domain of a master clock from which the common reference time is derived to timeslot borders of a first set of timeslots corresponding to a first of the radio modems and to timeslot borders of the second set of timeslots corresponding to a second of the radio modems.

24. The computer program product of claim 19, wherein at least one of the timeslots is generated from timing signal and a predetermined transmission allocation pattern, wherein the timing signal is one of sent from or received at one of the two or more radio modems.

25. The computer program product of claim 19, wherein the mapping uses at least a first beacon communicated from a first radio modem and at least a second beacon communicated from a second radio modem.

26. The computer program product of claim 25, wherein at least one of the first or second beacons defines a slot border or a beacon signal.

27. A component comprising:
   at least one input configured to couple to three or more radio modems;
   a first data pathway configured to couple with a processor and adapted to receive a master clock signal;

at least one output configured to couple to the two or more radio modems and adapted to output a set of allow/inhibit signals for each of the two or more radio modems; and wherein the processor is configured to:

map a set of first slot boundaries of a first transceiving schedule for a first of the three or more radio modems to a common reference time, the first set of slot boundaries relative to timing on a first network and the first transceiving schedule used by the first radio modem to communicate over the first network;

map a set of second slot boundaries of a second transceiving schedule for a second of the three or more radio modems to the common reference time, the second set of slot boundaries relative to timing on a second network and the second transceiving schedule used by the second radio modem to communicate over the second network;

map a set of third slot boundaries of a third transceiving schedule for a third of the three or more radio modems to the common reference time, the third set of slot boundaries relative to timing on a third network and the third transceiving schedule used by the third radio modem to communicate over the third network; and using the maps of the first, second, and third sets, generate the allow/inhibit signals so as to inhibit at least one activity of two of the first, second, and third transceiving schedules in a slot defined by sets of slot boundaries for the two transceiving schedules that overlaps with an authorized slot defined by a remaining transceiving schedule from the first, second, and third transceiving schedules and corresponding slot boundaries.

28. The component of claim 27 comprising an application specific integrated circuit specific to a radio modem synchronization and scheduling application.

29. The component of claim 28, wherein the first set of slot boundaries is received in a first beacon, wherein the second set of slot boundaries is received in a second beacon, and wherein the third set of slot boundaries is received in a third beacon.

30. The component of claim 27 wherein at least one of the first, second, and third transceiving schedules is received over the first data pathway from the processor.

31. The component of claim 30, wherein the first transceiving schedule comprises a predetermined transmission allocation pattern aligned with a timing signal received at the at least one input.

* * * * *